J. H. DEAN.
VOTING MACHINE.
APPLICATION FILED NOV. 8, 1907.

1,158,644.

Patented Nov. 2, 1915.
8 SHEETS—SHEET 2.

UNITED STATES PATENT OFFICE.

JAMES H. DEAN, OF CHICAGO, ILLINOIS, ASSIGNOR, BY MESNE ASSIGNMENTS, TO EMPIRE VOTING MACHINE COMPANY, A CORPORATION OF NEW YORK.

VOTING-MACHINE.

1,158,644.  Specification of Letters Patent.  Patented Nov. 2, 1915.

Application filed November 8, 1907. Serial No. 401,223.

*To all whom it may concern:*

Be it known that I, JAMES H. DEAN, a citizen of the United States, and a resident of Chicago, county of Cook, and State of Illinois, have invented certain new and useful Improvements in Voting-Machines, of which the following is a specification.

The invention relates to voting machines and, more particularly, to the interlocking mechanism therefor, and seeks to provide an efficient, easily operating interlock which may be employed for voting on large multicandidate groups, and also for cumulative groups where the voter is permitted to give one or more votes to the different candidates.

The invention also seeks to provide an improved form of interlocking device for the straight ticket keys, such that the operation of any two keys in different party columns will lock all of the straight ticket keys and the latter cannot be used for forcing the main interlock by moving an additional key to voted position.

The invention consists in the features of construction, combinations and arrangements of parts hereinafter set forth, illustrated in the accompanying drawings and more particularly pointed out in the appended claims.

In the drawings, Fig. 10ᴬ is a detail view of the straight ticket interlock, the parts being shown in the position which they will assume when one of the straight ticket rock shafts has been fully voted. Fig. 12 is a plan view of a portion of the interlocking mechanism looking in the direction of the arrows 12 in Fig. 1.

The machine is of the type illustrated in a prior application filed by me December 27, 1904, Serial No. 238,388. See Patent 1,013,646. It will be understood, however, that features of the invention may be readily applied to other types of voting machines.

Figures 4, 5:
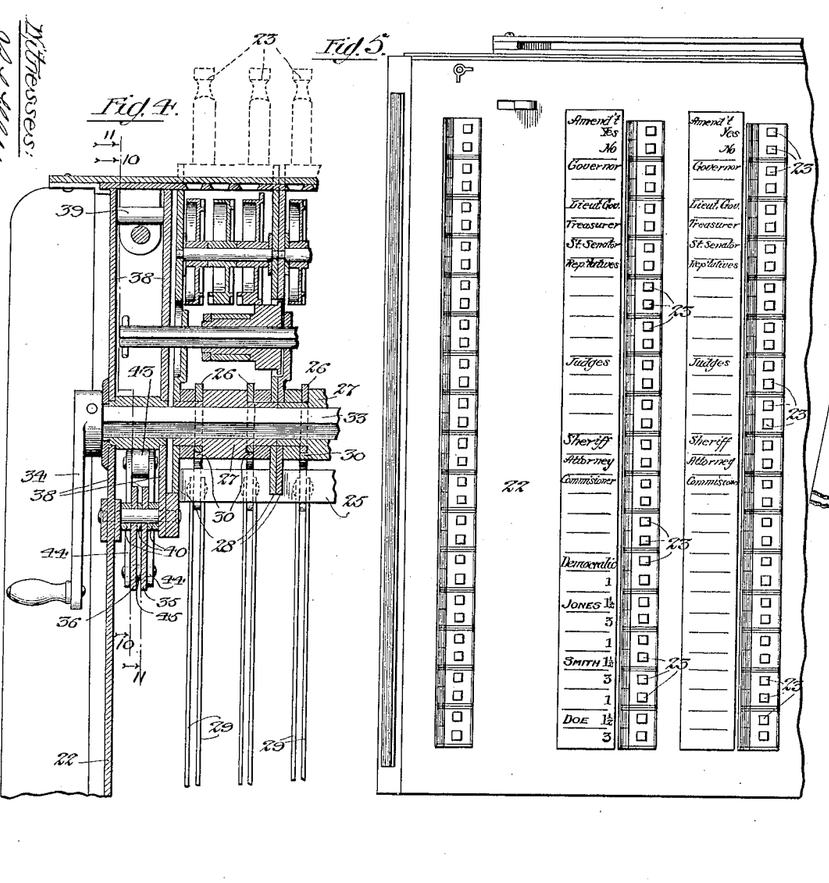
Fig. 4 is a large detail view with parts in section, on line 4—4 of Fig. 1.
Fig. 5 is a plan view showing a portion of the face plate of the machine.
Figure 6:
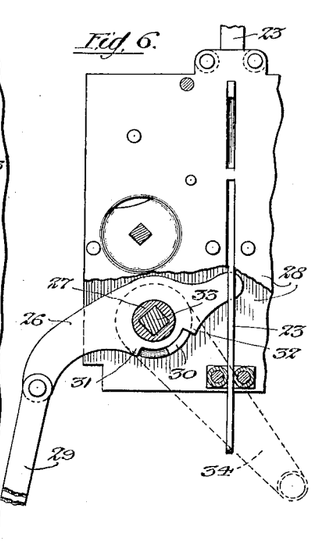
Fig. 6 is a detail view showing the connection between the voting keys, locking and restoring shafts and interlocking spreaders.
Figure 7:
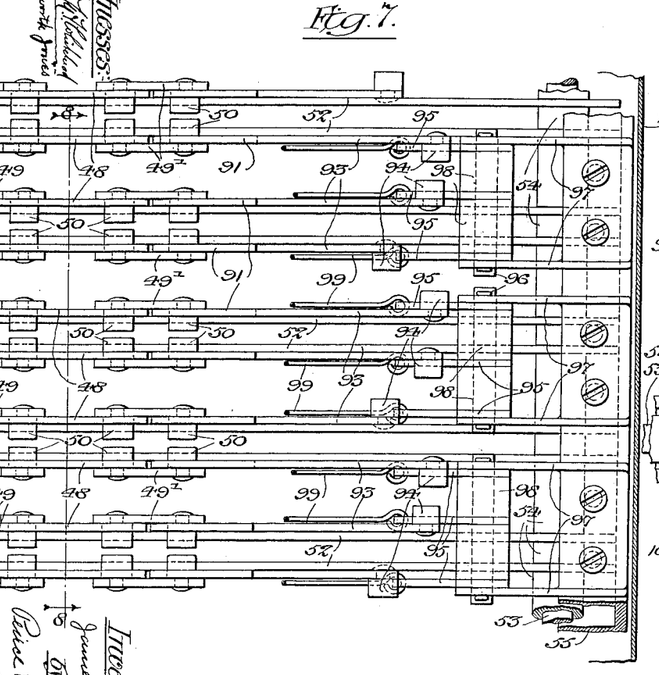
Fig. 7 is a detail plan view of a portion of the interlocking mechanism taken on line 7—7 of Fig. 1.
Figure 8:
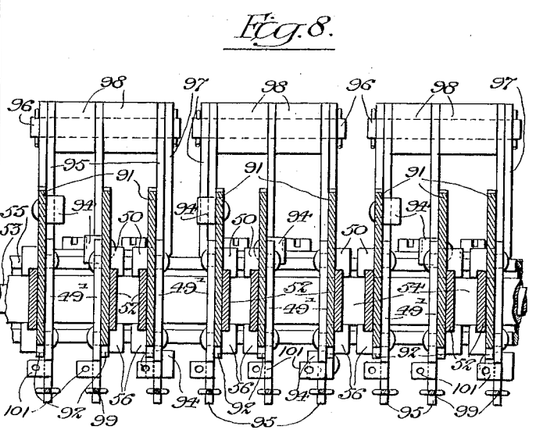
Fig. 8 is a detail section of a portion of the interlocking mechanism taken on line 8—8 of Fig. 1.
Figure 9:
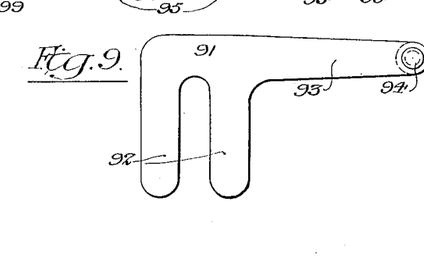
Fig. 9 is a detail view of a detachable member of the interlocking mechanism.

The machine casing 22 is boxlike and the voting keys 23 project through the upper face of the casing and are arranged in vertical columns which preferably correspond to the arrangement of the different party tickets and in transverse rows which preferably correspond to the different offices to be filled at an election. The printed ballot carrying the candidates' names is arranged in correspondence with the arrangement of the voting keys, as shown in Fig. 5.

The counting mechanisms are carried in unit sections 24 supported beneath the top plate of the machine on cross-bars 25. These counting mechanisms are in all respects similar to those set forth in my prior application referred to, and need not be more fully described here.

Each key 23 (see Fig. 6) engages one end of a rock-arm 26 that is mounted to swing loosely on a hub 27 that is journaled between the side plates 28 of the counter section. These rock-arms are connected by links 29 to the interlocking mechanism between the individual keys. They are also connected to suitable locking and restoring mechanism for the keys and to the straight ticket keys by which all of the keys in one party-column may be depressed or shifted to voted position. As clearly indicated in Figs. 4 and 6, the hubs 27 are provided with laterally projecting lugs 30 which are arranged to engage shoulders 31 and 32 on the rock-arms. A series of shafts 33 extend through the hubs and, as set forth in my prior application referred to, these shafts are moved by suitable mechanism to restore or move the keys up from voted position and to hold them locked in such position until the voter is admitted to the machine. The shafts are also provided on their forward ends with straight ticket keys 34, as shown in Figs. 4, 6, 10 and 11. It will be noted that the distance between the shoulders 31 and 32 is greater than the width of the lug 30, so that the individual candidate keys 23 may be independently shifted without moving any of the other keys in the same party column, although, when one of the keys is moved, the shaft 33 will be turned to one-eighth of a revolution. If the voter, however, should shift the shaft 33 through the medium of a straight ticket key, he will first take up the lost motion between the lug 30 and the shoulder 31 and, by turning the straight ticket shaft through a quarter turn, move all of the keys in any one row to voted position.

Figure 10:
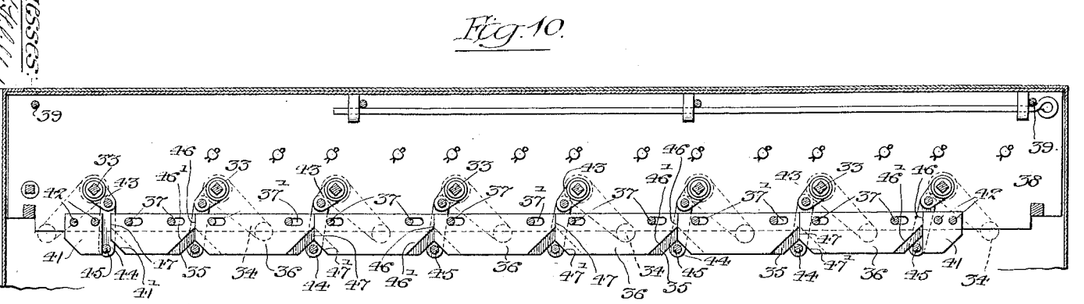
Figs. 10 and 11 are detail views of the auxiliary interlock of the straight ticket keys, parts being shown in section on lines 10—10 and 11—11, respectively, of Fig. 4.
Figures 10A, 11:
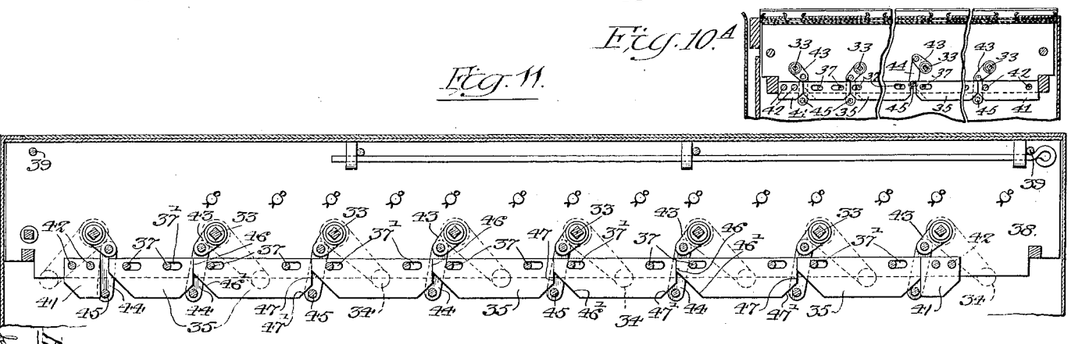
Figure 13:
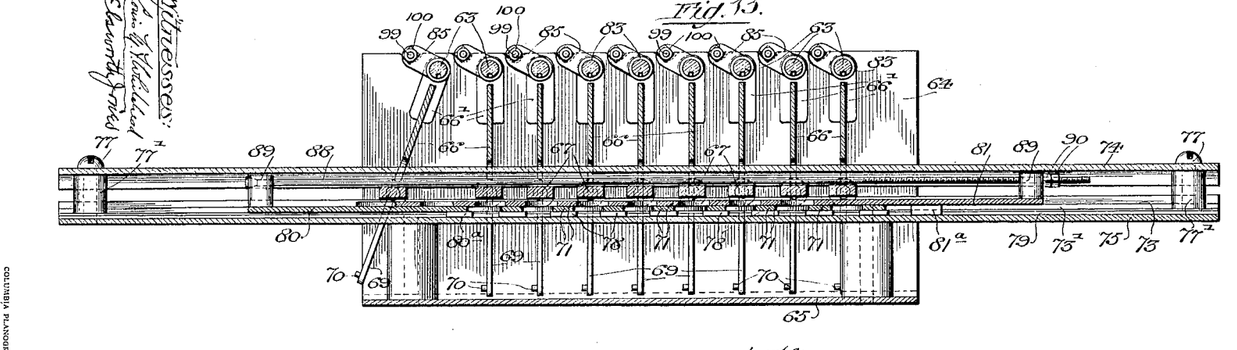
Fig. 13 is a section of parts shown in Fig. 12 on line 13—13 of Figs. 12 and 14.

The straight ticket keys of any machine necessarily have considerable leverage so that they may easily operate a large number of keys, and there is danger that a voter may force the main interlock of the machine by first voting all of the keys in a party column except one and then forcing this additional key to voted position by means of the straight ticket key, although he has already voted keys up to the proper capacity of the main interlock. To prevent any such operation of the straight ticket keys, the present invention provides a supplemental interlock comprising a series of slide blocks 35 and an overlapping set of slide blocks 36 (see Figs. 4, 10 and 11). These blocks are mounted to slide on pins 37 which extend between the plates 38 at the front of the machine. These plates are connected by the pins 37 and by pins 39 at their upper edges and the blocks 35 and 36 are held apart from one another and from the plates by washers 40 mounted on the pins 37, as shown in Fig. 4. The end blocks of both series are arranged to abut against stops 41 fixed by pins 42 to the plates 38. A series of arms 43, the hubs of which are journaled between the plates 38, engage the forward ends of the shafts 33 and are each connected by two links 44 which extend down on opposite sides of the rows of blocks 35 and 36 and which are connected at their lower ends by a cross pin or spreader 45. These spreaders are arranged between the beveled ends of the blocks, as shown in Figs. 10 and 11. The blocks have square, abutting faces 46 and 47 on their opposite ends, and one face 47 is longer than the opposite interlocking face 46. Moreover, it will be noted that the long abutting faces are at the right-hand end of the row of blocks 35 and at the left hand end of the row of blocks 36. When a straight ticket key is given a full quarter turn and one of the shafts 33 is correspondingly moved a quarter revolution, the corresponding spreader 45 will be drawn up to engage the short interlocking faces 46 and the entire series of blocks will be locked so that no other straight ticket key can be operated without first retracting the one voted. When the individual candidate keys are operated, the shafts 33 are only moved through one-eighth of a revolution and this is only sufficient to bring the spreaders against the long interlocking faces 47. It is obvious that all of the shafts may be given an eighth turn so that the voter may readily split as he desires, but that when two of the shafts have been given an eighth turn, the auxiliary interlocking device will prevent more than an eighth turn being given to any of the shafts. It is impossible, therefore, for the voter to place any strain upon the main interlocking mechanism.

Figure 1:
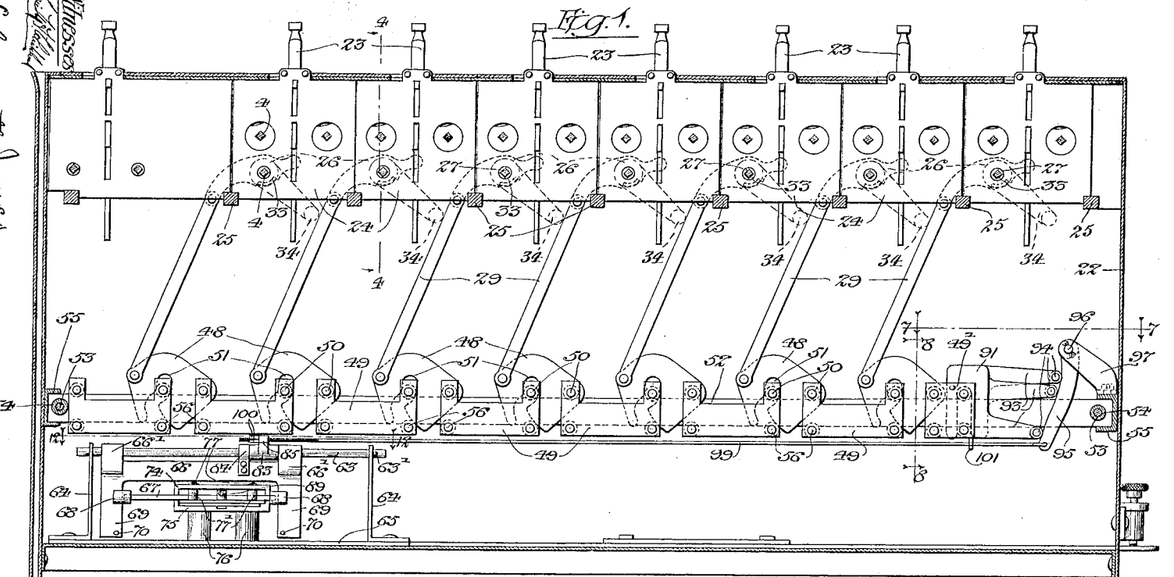
Figure 1 is a cross-section of the machine showing the operating keys and improved interlocking mechanism.
Figure 2:
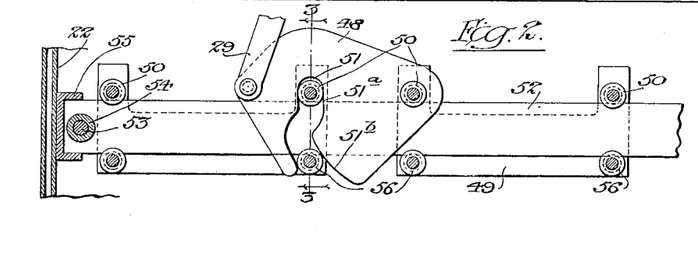
Fig. 2 is a large detail view of the interlocking mechanism.
Figure 3:
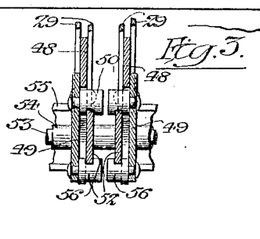
Fig. 3 is a detail section thereof on line 3—3 of Fig. 2.

The main interlocking mechanism comprises a series of devices which are arranged to positively expand and contract the interlocking mechanism. These devices consist of a series of plates 48 which are connected to the double links 29 depending from the rock arms 26 which, as stated, are connected to the voters' keys 23. Each interlocking device or spreader 48 is pivotally connected to one of the slides or blocks 49 by a pin 50 and is provided with a cam-slot 51 which engages the pin 50 on the next adjacent slide. There is one row of slides 49 for each office row of keys and they are carried upon longitudinal supports 52 (see Fig. 3) which are supported at their ends by cross-bolts 53 and properly spaced by collars 54 on the bolts. They are also sustained at their ends in channel bars 55. The slides 49 are U-shaped, as shown, and are provided at their upper ends with the pins 50 and at their lower edges with pins 56 and these pins are slotted to engage the supports 52. The spreading devices are mounted on the pins 50 between the slides 49 and the supports 52. The cam-slot 51 is provided with two surfaces $51^a$ and $51^b$, which are struck on arcs from the pivot pin 50 of the spreader. In unvoted position the surface $51^a$ engages the pin 50 of the next adjacent slide and in the voted position of the key the surface $51^b$ engages the pin 50, so that the adjacent slides are spread apart. By having these surfaces concentric with the pivot pin 50, the shift of the slides 49 will not interfere with the accuracy of the interlock. The spreading of the slides can be limited in any suitable manner; for example, by fixed stops, to permit of the operation of a single key in one office row and all of the rows of slides could be connected together and their movement properly limited by fixed stops or otherwise to form a multi-candidate group in which two or more keys may be operated.

Figures 19, 20, 21:
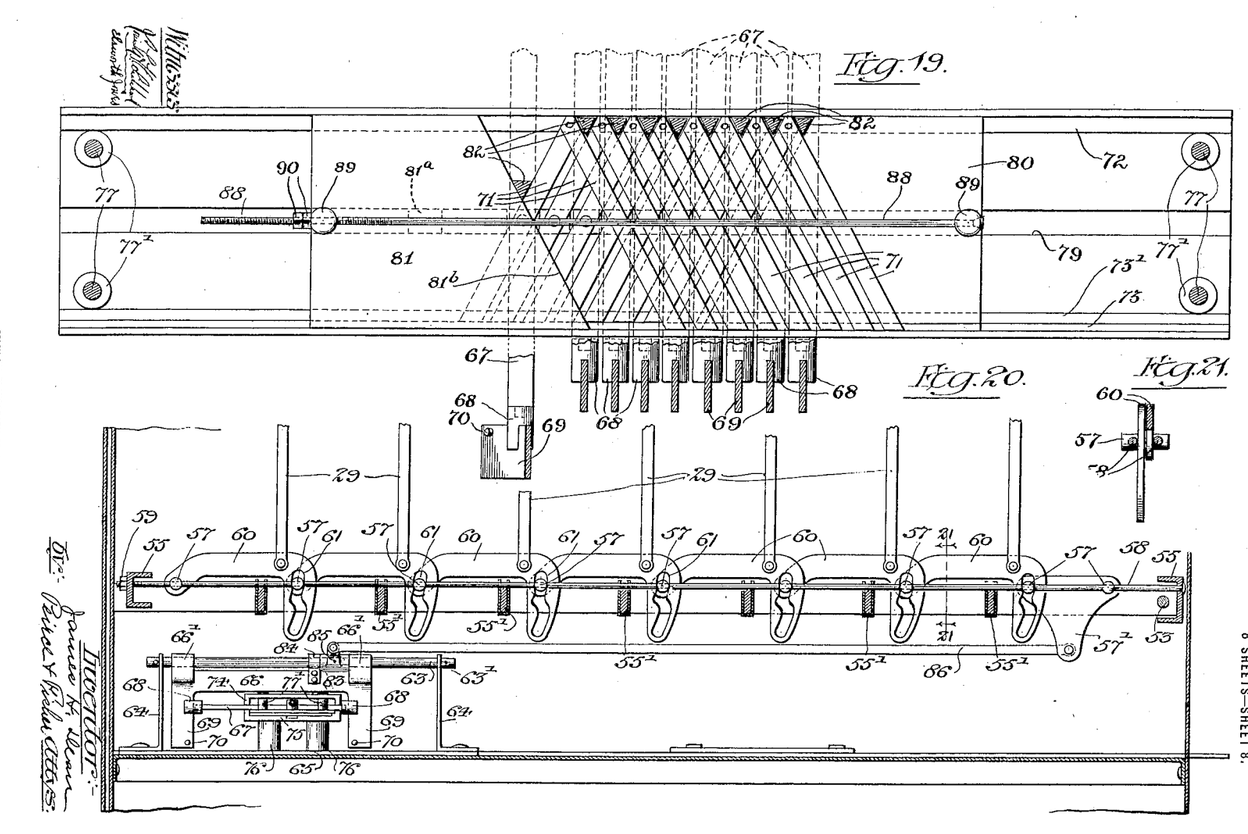
Fig. 19 is a view similar to Figs. 16 and 17 showing a different arrangement of the parts.
Fig. 20 is a view similar to Fig. 1 showing a modified arrangement of the interlocking mechanism.
Fig. 21 is a cross section on the line 21—21 of Fig. 20.

Figs. 20 and 21 illustrate a modified form of interlock in which the slides are in the form of cross-pins 57 strung on a pair of rods 58. These supporting rods extend between the channel bars 55 and are held under tension by nuts 59 threaded upon their ends. The L-shaped spreading devices 60 are each pivoted on one pin 57 and provided with a cam-slot 61 (similar to the cam-slot 51 of the spreaders 48), which engages the next adjacent pin. A series of transverse supports 55 are also preferably provided with apertures for the rods 58. The last spreader 60 at the right-hand end of each office row engages the next to the last pin 57 and the two end pieces support a slide 57'. This interlock may be grouped by fixed stops or otherwise, but the improvement provides a special limiting mechanism by which a large number of office rows may be readily connected.

Figures 14, 15:
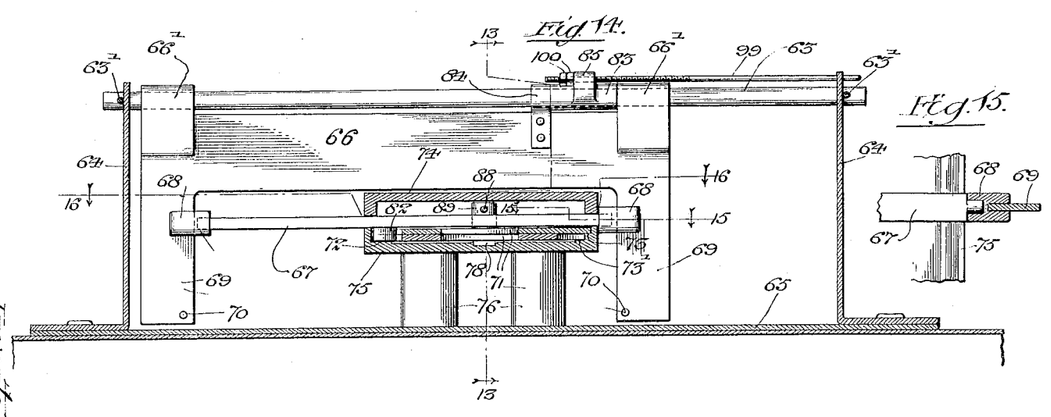
Fig. 14 is a transverse section on lines 14—14 of Fig. 12.
Fig. 15 is a detail section on line 15—15 of Fig. 14.

This special limiting mechanism is illustrated in Figs. 12–20 and is mounted upon a frame comprising side supports 64 and a connecting bottom plate 65. A series of transverse rods 63 extend through the upper ends of the side supports 64 and are held in position and against rotation by a pin or wire 63' extending through the ends of the entire series. A series of U-shaped wings 66 are provided with perforated lugs 66' engaging the rods 63 in such a manner that the wings are free to slide and also swing upon the rods. These wings are provided with depending portions 69 which engage slots in the heads or end pieces 68 of a series of sliding bars 67. These bars 67 are mounted to slide both longitudinally and transversely between a pair of channels 74 and 75. These channels are supported by standards 76 and are connected together and suitably spaced by screws 77 and separating sleeves or collars 77' surrounding these screws. The head pieces 68 are swiveled to the bars 67 as shown in Fig. 15, so that the bars can move transversely between the channels 74 and 75 and the wings 66 swing upon the transverse rods 63. The bars 67 may also move lengthwise or in longitudinal direction between the channels 74 and 75 when the wings 66 are moved in longitudinal direction upon the rods 63.

The channels 75 are supported in proper position above the base plates 65 upon studs 76.

Within the lower channel 75 are arranged a series of overlapping V-shaped interlocking devices comprising upper and lower leg portions 71. At one end the corners of these slides rest upon a ledge 72 formed upon the channel 75 and at the opposite side the uppermost legs of the slides rest upon a ledge 73 while the lowermost legs, which are shorter than the upper legs, rest upon a ledge 73'. Each of the lowermost legs of the slide is provided with a block 78 arranged to engage a groove 79 in the bottom of the channel 75 and these blocks, when the slides are jammed together, are arranged to engage and hold the slides slightly apart. A plate 80 is arranged to slide upon the ledges 72 and 73' of the channel and is provided with a block 80$^a$ for engaging the blocks upon the lower legs of the slides. It is also provided with an inclined edge 80$^b$ corresponding to the inclination of the lower legs of the slides. A plate 81 at the opposite end is arranged to slide upon the ledges 72 and 73 and is provided with a similar block 81$^a$ and an inclined edge 81$^b$, corresponding to the inclination of the uppermost legs of the slides. It will be observed that the uppermost legs and the plate 81 overlap the lowermost legs of the slides and the plate 80.

Each of the longitudinally and transversely movable slide bars 67, which are arranged immediately above the slides 71, is provided with a depending spreader 82 and these spreaders extend downwardly between the several slides and between the end slides and the plates 80 and 81. These spreaders are preferably V-shaped, as shown, and have inclined working faces corresponding to the inclination of the legs 71 of the interlocking slides.

A sleeve 83 (see Figs. 13 and 14) is mounted on each of the rods 63 and is slidable thereon but is keyed to the rods so that it cannot rotate. This sleeve is held against one of the lugs 66' of the wing 66 by a strap or collar 84 fixed to the wing. Each sleeve 83 is provided with a projecting lug 85 by which it may be connected to the end block or slide of the interlocking spreaders or slides of one office row. In the form shown in Fig. 20, this is effected by a link 86 extending between the sleeve 83 and the end slide 57'. It will be understood that in this way a series of office rows of interlocking devices may be connected to each of the wings 66 and slide bars 67. By properly limiting the movement of the slides 71 the office rows so connected could be divided into single or multi-candidate groups. For example, if the slides 71 and plates 80 and 81 were secured in the position shown in Fig.

Figures 16, 17:
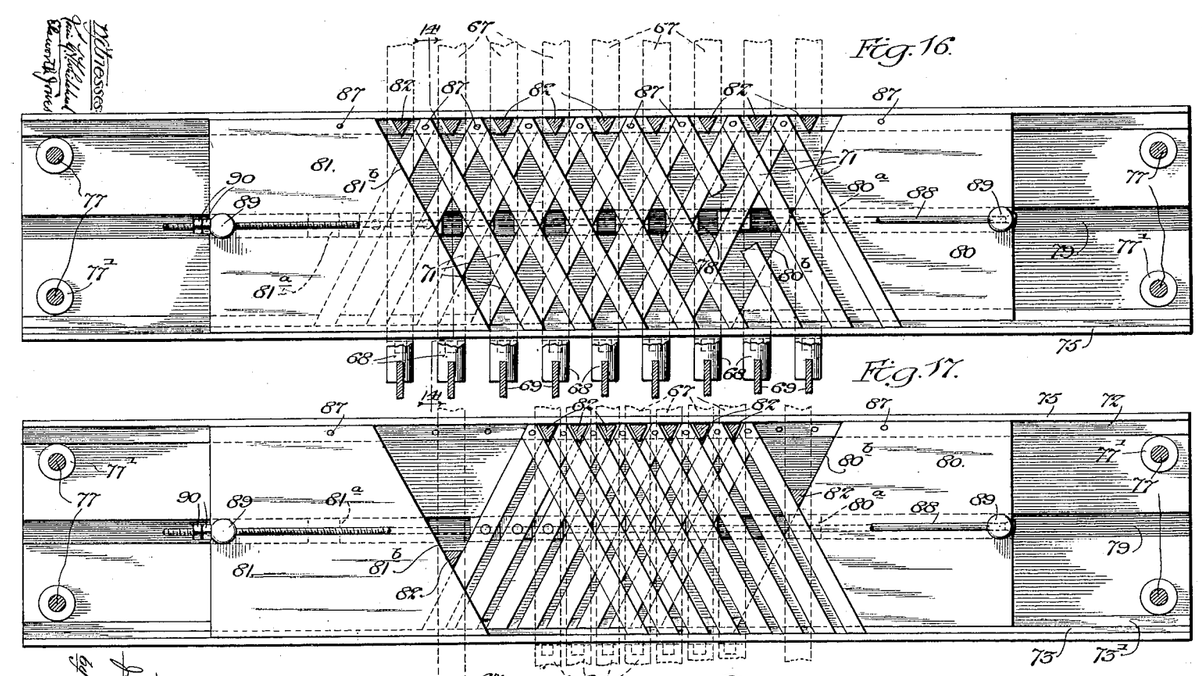
Figs. 16 and 17 are detail sections on line 16—16 of Fig. 14 showing the parts in different positions.
Figure 17:
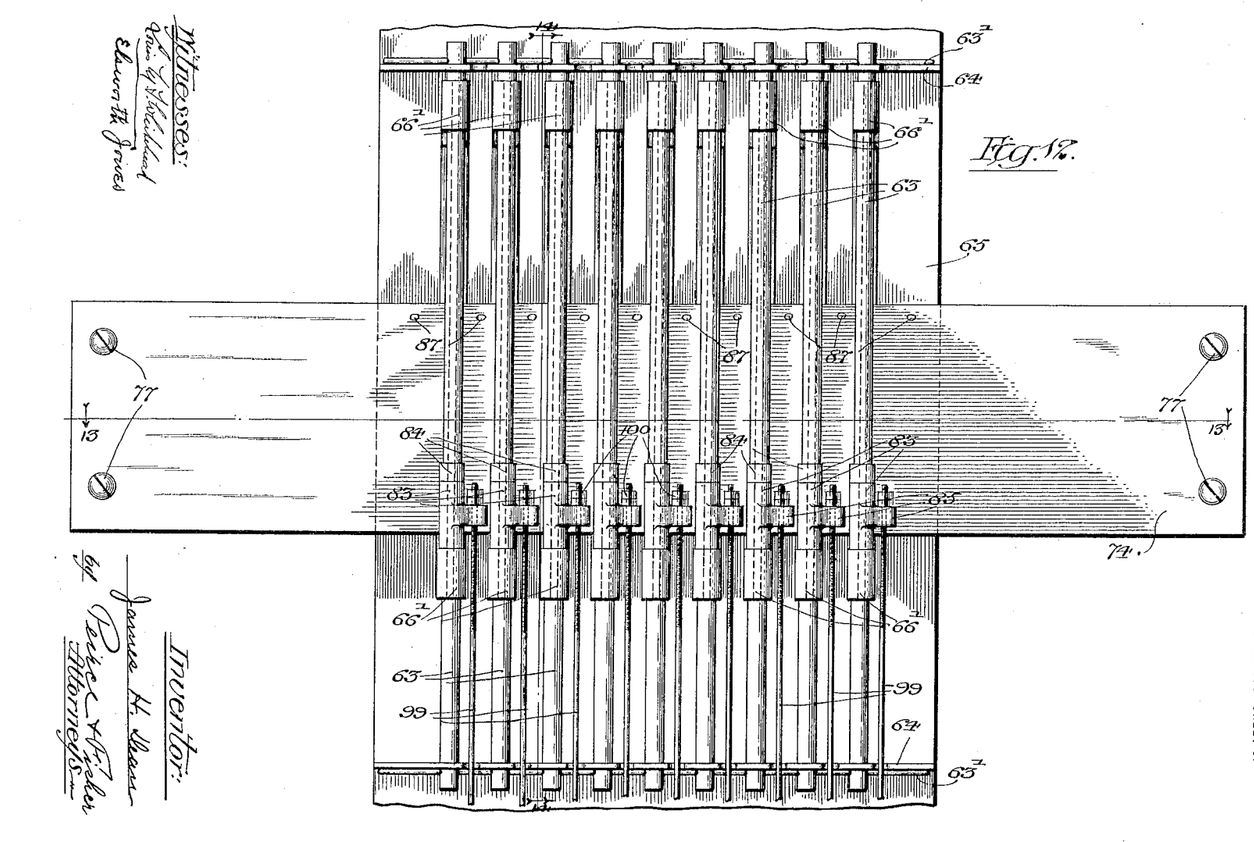
Figure 18:
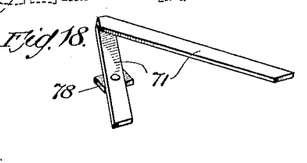
Fig. 18 is a detail perspective view of one of the slides shown in Figs. 16 and 17.

16 by pins 87, the nine rows of voting devices connected thereto would form nine single candidate groups, and one key in each row could be operated to move the corresponding wing 66 and slide bar 67. But when this was done, further movement would be prevented by the engagement of the spreader 82 with two of the slides. If, however, all of the slides were left free to move and the spread of the end plates 80 and 81 were properly limited, then the nine rows would be thrown into a multi-candidate group of nine, as indicated in Fig. 17, in which six keys have been voted in one office row and three in another. The movement of the plates 80 and 81 is preferably limited by a connecting link 88 extending through upwardly extending studs 89 on the plates. One end of the link or rod 88 is headed and the other is provided with adjusting and locking nuts 90. This mechanism has been found capable of use with very large groups, and at the same time may be very easily operated. In Figs. 1, 7, 8 and 20 I have shown the improved limiting mechanism applied for use in a cumulative group in which each candidate, as shown at the lower part of Fig. 5, is provided with three keys representing, respectively, 1 vote, 1½ votes and 3 votes. The end slide 49′ Fig. 7 of the corresponding rows of interlocking devices instead of being directly connected to the limiting mechanism, are provided with a series of detachable members 91 having depending lugs 92 which engage the end pieces 50 and 56 of the slides and are provided with projecting arms 93 having offset pins 94. These pins engage a series of levers 95 which are supported upon a crossshaft 96 arranged between the arms of the U-shaped brackets 97. These brackets are mounted upon the channel 55 and the arms 95 are properly held in position on the shaft 96 by sleeves 98. There is one arm 95 for each office row and the arms are connected by links 99 to the sleeves 83 of the limiting mechanism.

It will be noted that the pins 94 are arranged at different distances from the pivots of the arms 95 so as to transmit variable movement to the limiting mechanism. That is to say, the member 91 having the lowermost pin is attached to a row of voting devices representing three votes; the device having the highest pin is attached to a row of voting devices representing but one vote, and, the device having the intermediate pin, to the voting devices representing 1½ votes. The limiting mechanism shown in Fig. 20 is so adjusted that only one three-vote key, two 1½ vote keys or three one-vote keys may be operated. The devices 91 may be readily removed from the end slides 49′ and the latter are provided with depending lugs 101 so that they may be directly connected to the limiting mechanism by the links 99, or the slides may be otherwise moved. In this way the same interlocking mechanism may be used either for cumulative or for regular voting.

It is obvious that numerous changes may be made in the details set forth without departure from the essentials of the invention.

Having described my invention, what I claim as new and desire to secure by Letters Patent, is:—

1. In voting machines, the combination of a series of keys and an interlocking mechanism therefor comprising a series of cam devices connected to the keys and arranged to positively expand and contract the interlock, each of said cam devices being pivotally connected to one adjacent cam device and having a cam-slot-and-pin connection with the other adjacent device, the opposite ends of said cam slot being concentric with said pivot.

2. In voting machines, the combination of a series of keys and an interlocking mechanism therefor comprising a series of transversely movable slides or spacers and a series of cam devices connected to said keys and to said slides or spacers, said cam devices having a pivoted connection with one adjacent slide or spacer and a cam-slot-and-pin connection with the other adjacent slide or spacer.

3. In voting machines, the combination of a series of individual candidate keys arranged in party columns or groups, a series of straight ticket keys, each arranged to move one party column or group to voted position while permitting their independent movement to such position, a main interlocking mechanism between the individual candidate keys and an auxiliary interlocking mechanism controlled both by said individual keys and by said straight ticket keys arranged to prevent the complete movement of any straight ticket key when two or more individual keys in different party columns are in voted position.

4. In voting machines, the combination of a number of groups of individual keys, one group for each party ticket, a series of straight ticket keys, each arranged to move one group of individual keys to voted position but permitting of their independent movement to such position and an auxiliary interlock for said party levers controlled by said individual and said straight ticket keys for preventing the full movement of any straight ticket key to voted position when individual keys in two or more party groups have been operated.

5. In voting machines, the combination with the individual keys arranged in party columns, a series of straight ticket keys and shafts, one for each party column, said shafts having lost motion, two-way connections with said individual keys, a main interlock between the individual keys and an auxiliary interlock between the straight ticket keys comprising two sets of overlying blocks or spacers and spreaders for said blocks or spacers connected to said straight ticket keys said blocks or spacers having differently arranged interlocking faces so that all of the straight ticket keys may be partially moved from voted position but so that none of the straight ticket keys can be completely moved to voted position when individual keys in two-party columns have been operated.

6. In voting machines, the combination of a series of overlapping, V-shaped slides, means for limiting the movement of said slides, a series of laterally and longitudinally movable spreaders for said slides, a series of swinging and longitudinally movable wings connected to said spreaders, and connections between said wings and said keys.

7. In voting machines, the combination of a series of groups of voting keys, each group representing a different number of votes, a common interlock for said keys, and a system of differential levers actuated by the different groups of keys for variably operating said common interlock.

8. In voting machines, the combination of a series of rows of keys, the keys of the separate rows representing respectively different numbers of votes, a set of interlocking devices operated by each row of keys, a series of levers differentially operated by said set of interlocking devices, and a common limiting mechanism comprising a series of slides and a series of spreaders therefor connected to said differentially operated levers.

9. In voting machines, the combination with a series of keys, of interlocking mechanism therefor comprising a series of pivoted cam devices, each connected to one of said keys and arranged to positively expand and contract the interlocking mechanism, and means for variably arranging said interlocking mechanism and keys in single and multi-candidate groups.

10. In voting machines, the combination with a number of groups of keys, of an interlock for each group comprising a series of cam devices, one connected to each of said keys and arranged to positively expand and contract the interlock, a series of overlapping slide blocks, means for limiting the movement of said blocks and a number of progressively movable spreaders for said blocks, one connected to the interlock of each group of keys.

11. In voting machines, the combination of a series of individual candidate keys arranged in party columns or groups, a series of straight ticket keys, each arranged to move one party column or group of individual keys to voted position while permitting their independent movement to such position, interlocking mechanism interposed between the individual candidate keys, and means independent of said interlocking mechanism controlled by said individual keys and arranged to prevent the complete movement of any straight ticket key to voted position when two or more individual keys in party columns are in voted position.

12. The combination in a voting machine of individual keys arranged in party columns, a series of straight ticket keys, one for each party column, each straight ticket key being connected to the keys of its party column, each of said straight ticket keys being capable of moving the keys of its party row and being capable of a partial movement by any of its keys, and an interlock between said straight ticket keys to prevent the full movement of said straight ticket keys when two or more of them have been moved by their single candidate keys.

13. In a voting machine, keys arranged in lines corresponding to different numbers of permissible votes, an interlock for each line, and mechanism connecting the interlocks and effective upon actuation of a key of one line to render a number of keys of a second line inoperative and effective upon actuation of a key of the second line to render a different number of keys of the first mentioned line inoperative.

14. In a voting machine, keys arranged in lines corresponding to different numbers of permissible votes, in combination with means for rendering a number of keys of one line inoperative by the actuation of a key of a second line including means for rendering a different number of keys inoperative in said second line by the actuation of a key in the first mentioned line, and means for varying the number of keys rendered inoperative.

15. In a voting machine, keys for cumulative and non-cumulative voting, interlocking mechanism for said keys, and mechanism interconnected with said interlocking mechanism effective upon actuation of a key of one of said classes to render other of said keys inoperative, said interconnecting mechanism being effective upon actuation of one of said other keys to render a different number of said first keys inoperative.

16. In combination in a voting machine, keys arranged in party rows and office lines, means for actuating the keys of one row and locking the other rows against actuation, and means whereby the actuation of a key in one line will prevent the actuation of a number of keys in a second line including means for preventing the actuation of a different number of keys in said first mentioned line by the actuation of a key in the second line.

17. In combination in a voting machine, keys arranged in party rows and office lines, means for actuating the keys of one row and locking the other rows against actuation, means whereby the actuation of a key in one line will prevent the actuation of a number of keys in a second line including means for preventing the actuation of a different number of keys in said first mentioned line by the actuation of a key in the second line, and means for varying the number of keys prevented from being actuated.

JAMES H. DEAN.

Witnesses:
HARRY L. CLAPP,
KATHARINE GERLACH.

Copies of this patent may be obtained for five cents each, by addressing the "Commissioner of Patents, Washington, D. C."